Patented Jan. 1, 1935

1,986,509

UNITED STATES PATENT OFFICE 1,986,509

PROCESS FOR MAKING MAGNESIUM HYDROXIDE

Walter Hoge MacIntire, Knoxville, Tenn., assignor to American Zinc, Lead & Smelting Company, St. Louis, Mo., a corporation of Maine No Drawing. Application May 24, 1932, Serial No. 613,340

11 Claims. (Cl. 23—201)

This invention relates to a process for making magnesium hydroxide from solutions of magnesium compounds or salts by means of ammonia, preferably ammonia gas. The product produced may be either in a light, dry form which can be used for insulating purposes, or dispersed in water to obtain milk of magnesia, etc., or in a heavier crystalline form which can be used for example as a valuable supplement to fertilizer materials, or either form may be calcined to produce magnesium oxide.

It has been proposed heretofore to make magnesium hydroxide by dissolving magnesium sulphate in water and adding ammonia liquor to the solution or gaseous ammonia to the solution, whereby magnesium hydroxide is formed as a precipitate, the ammonia used being double the theoretically correct proportion to combine with the magnesium salt such as magnesium sulphate, with the result that the yield of magnesium hydroxide has been much less than the theoretical yield because of the known tendency of ammonium compounds to dissolve magnesium precipitates or to retard precipitation thereof. Such ammonium compounds are generated by exchange during the reaction by which magnesium hydroxide is thrown out of solution by the addition of ammonia. Moreover, the product as heretofore produced has been filterable only with great difficulty, if at all, and consequently the product had to be washed by repeated decantations and finally dried.

One of the objects of the present invention is to provide a novel process for producing magnesium hydroxide by reaction between magnesium salts and ammonia gas whereby the yield of magnesium hydroxide is substantially the theoretical yield and whereby the product formed is readily filterable so that it can be washed by filtration and filtered by suction if desired.

Other objects will appear more fully hereinafter as the description of the invention proceeds.

In carrying out the process, a suitable magnesium salt is dissolved in water to form a solution of desired concentration. Preferably the magnesium salt employed is magnesium sulphate which can be obtained from any desired source, although other magnesium salts such as magnesium chloride may be used instead. The magnesium salt is then converted into magnesium hydroxide by adding ammonia, preferably in gaseous form, to the salt solution, the magnesium hydroxide being recovered and washed by filtration after conversion is effected and thereafter dried or otherwise treated. Where as heretofore proposed the ammonia is added in the form of ammonia liquor, the product produced is inferior to that which can be obtained by using ammonia in gaseous form. Moreover, where as heretofore proposed the proportion of ammonia added has been double the chemical equivalent required to combine with the magnesium compound, the yield of magnesium hydroxide has been much less than the theoretical yield which should be obtained. It has been found that if the amount of ammonia is about three times the theoretical amount, the actual yield of magnesium hydroxide obtained is approximately 95% or more of the theoretical yield. By using this excess of ammonia, the reaction between the ammonia and the magnesium compound is forced to completion and the tendency of ammonium salts to hold magnesium hydroxide in solution or to retard its precipitation is overcome.

After conversion of the magnesium salt into magnesium hydroxide has been effected, the magnesium hydroxide precipitate is recovered and washed by filtration as stated above. To the end that the precipitation may be readily filterable, it has been found that the concentration of the magnesium salt in the starting solution is important and that the proportion of magnesium sulphate for example to water should be at least 8% exclusive of water of hydration as otherwise it will be difficult, if not impossible, to filter the precipitate.

The invention will be described hereinafter with reference to the use of magnesium sulphate as a starting material, although it will be appreciated that other sources of magnesium may be utilized. The magnesium sulphate may be obtained in any suitable manner and the solution of the desired concentration may be formed by dissolving the requisite quantity of magnesium sulphate therein. For example, suitable quantities of ordinary magnesium sulphate or Epsom salts may be dissolved in water. Another source of magnesium sulphate solution is the by-product formed in the process of producing calcium sulphate by reaction between materials such as dolomite and sulphuric acid. For example, the process described in the co-pending application, Serial No. 591,446, filed February 6, 1932, by Walter Hoge MacIntire and Thomas Barnes Stansel, includes the addition of quantities of dolomite to a solution of sulphuric acid. After the reaction is completed, the hydrated calcium sulphate is filtered from the solution and the filtrate comprises mainly a solution of magnesium sulphate which may be employed as the starting solution for a process embodying the present invention. Where magnesium chloride is used, the reaction in general does not go so nearly to completion as in the case of magnesium sulphate and moreover, the ammonium chloride by-product is not as valuable as the ammonium sulphate by-product.

For the production of magnesium hydroxide in a light, dry form, the concentration of magnesium sulphate in the starting solution should be preferably not less than 8% exclusive of water of hydration (8% Mg SO4 rather than 8% Mg SO4.7H2O).

To this solution ammonia is added in gaseous form until the amount of ammonia is approximately three times the theoretical quantity of ammonia needed to combine with the magnesium sulphate present in the starting solution. For example, ammonia gas may be added in an amount 3.23 times the chemical equivalent required to combine with the magnesium sulphate of the solution. This suspension may be permitted to stand for any convenient length of time, the production of magnesium hydroxide reaching as high as about 95% of the theoretical yield.

The magnesium hydroxide is then filtered and washed, preferably in a closed system to prevent loss of the ammonia gas. If the material is filtered by suction, a minimum of drying will be required and the light, dry magnesium hydroxide may be produced in cakes or slabs to be used for any suitable purpose. The ammonia gas is preferably recovered from the filtrate in any suitable manner and thereafter the filtrate may be concentrated by evaporation in order to recover its content of ammonium sulphate. The magnesium hydroxide produced by this process is a finely divided white material having an apparent density of approximately .14. This product can be used as such or in place of magnesium oxide since it is easily converted to the oxide by ignition at a low temperature.

In some cases it may be desired to produce the magnesium hydroxide in a heavier crystalline form which can be accomplished by varying somewhat the details of the example given above. By way of a specific example, the starting solution should have a concentration of approximately 16% magnesium sulphate instead of the 8% referred to above. This solution is added gradually and with constant and vigorous agitation to an equal volume of water, while at the same time ammonia gas is slowly introduced into the mixture. The amount of ammonia gas introduced in this way may be approximately twice the theoretical amount required to combine with the magnesium sulphate. This mixing and agitation may take place over a period of time approximating thirty minutes and toward the end of this period an additional quantity of ammonia gas is added with an accelerated influx until the total amount of ammonia gas becomes approximately three times the theoretical quantity required to combine with the magnesium sulphate. After standing, the magnesium hydroxide is recovered from the mixture in the manner described above, as are likewise the ammonia gas and the ammonium sulphate.

The yield of this heavy magnesium hydroxide is not quite as high as the yield obtained with the process previously described for producing light magnesium hydroxide. When calcined, the heavier magnesium hydroxide yields a heavier type of magnesium oxide than that obtained by calcining the extra light magnesium hydroxide. This magnesium oxide may be put to any of the usual uses of this material and moreover, the heavy magnesium hydroxide as well as its oxide derivative may be used advantageously as supplements to various standard types of fertilizer materials.

Where the magnesium sulphate solution is obtained from the previous treatment of dolomite with sulphuric acid as described above, the dolomite should preferably be free from or at least low in content of iron, aluminum and manganese. If excessive quantities of these impurities are present, the magnesium sulphate may still be utilized but the hydrated oxides of the impurities should first be thrown out of solution and eliminated by filtration in any suitable way. This preliminary purification does not interfere with the practice of the present invention.

While for the purpose of describing the invention clearly, specific proportions, temperatures and procedures have been stated, it will be readily understood by those skilled in the art that these specific examples are for purposes of illustration only and may be departed from without departing from the spirit of the invention. Thus the starting materials, concentration of solution, amount of ammonia, and details of procedure stated above are not to be construed as definitions of the limits of the invention, reference being had to the appended claims for this purpose.

What is claimed is:

1. A process of making magnesium hydroxide which consists in forming a solution of magnesium sulphate in water, adding ammonia to the solution in an amount approximately three times the theoretical amount required to convert said magnesium sulphate and recovering the magnesium hydroxide from the mixture.

2. A process for making magnesium hydroxide which consists in forming a solution of a magnesium salt in water, adding ammonia gas to the solution in an amount approximately three times the theoretical amount required to combine with said magnesium salt, filtering the magnesium hydroxide precipitate from the mixture and drying the magnesium hydroxide.

3. A process for making magnesium hydroxide which consists in forming a solution of magnesium sulphate in water, the amount of magnesium sulphate exclusive of water of hydration being at least 8% of the solution, adding ammonia to the solution in an amount approximately three times the theoretical amount required to combine with the magnesium sulphate, and recovering the magnesium hydroxide from the mixture.

4. A process for making magnesium hydroxide which consists in forming a solution of magnesium sulphate in water, the amount of magnesium sulphate exclusive of water of hydration being approximately 8% of the solution, adding ammonia gas to the solution in an amount approximately three times the theoretical amount required to combine with the magnesium sulphate, allowing the solution to stand until conversion is completed, and recovering the magnesium hydroxide precipitate from the mixture.

5. A process for making magnesium hydroxide which consists in forming a solution of magnesium sulphate in water, the amount of magnesium sulphate exclusive of water of hydration being approximately 16% of the solution, adding said solution slowly and continuously to a substantially equal volume of water simultaneously with ammonia gas, the amount of ammonia added exceeding the theoretical amount required to combine with the magnesium sulphate, then adding additional ammonia gas to the mixture, and finally filtering the magnesium hydroxide precipitate from the mixture.

6. A process for making magnesium hydroxide which consists in forming a solution of magnesium sulphate in water, the amount of magnesium sulphate exclusive of water of hydration being approximately 16%, adding said solution gradually to a substantially equal volume of water and with agitation, simultaneously adding ammonia gas to the mixture of solution and water and accelerating the addition of ammonia gas as the addition of the solution nears completion, the total amount of ammonia gas being approximately three times the theoretical amount required to combine with the magnesium sulphate, and finally recovering the magnesium hydroxide precipitate from the mixture.

7. The process of making magnesium hydroxide which consists in forming a solution of magnesium sulphate in water, the amount of magnesium sulphate exclusive of water of hydration being approximately 16%, slowly and continuously adding said solution to a volume of water approximately equal to that of the magnesium sulphate solution, and continuously injecting ammonia gas simultaneously with the addition of said solution to said volume of water, and finally recovering the magnesium hydroxide precipitate from the mixture.

8. A process for making magnesium hydroxide which consists in forming a solution of magnesium salt in water, the amount of magnesium salt exclusive of water of hydration being approximately 16% of the solution, slowly and continuously adding said solution to a substantially equal volume of water continuously and simultaneously adding ammonia gas to said volume of water, the amount of ammonia gas added exceeding the theoretical amount required to combine with the magnesium sulphate, then adding additional ammonia gas to the mixture, and finally filtering the magnesium hydroxide precipitate from the mixture.

9. A process for making magnesium hydroxide which consists in forming a solution of magnesium salt in water, the amount of magnesium salt exclusive of water of hydration being approximately 16%, adding said solution gradually to a substantially equal volume of water and with agitation, simultaneously adding ammonia gas to the mixture of solution and water and accelerating the addition of ammonia gas as the addition of the solution nears completion, the total amount of ammonia gas being approximately three times the theoretical amount required to combine with the magnesium salt, and finally recovering the magnesium hydroxide precipitate from the mixture.

10. A process for making magnesium hydroxide which consists in forming a solution of magnesium sulphate in water, the amount of magnesium sulphate exclusive of water of hydration being approximately 16%, adding said solution gradually to a substantially equal volume of water and with agitation, simultaneously adding ammonia to the mixture of solution and water and accelerating the addition of ammonia as the addition of the solution nears completion, the total amount of ammonia being approximately three times the theoretical amount required to combine with the magnesium sulphate, and finally recovering the magnesium hydroxide precipitate from the mixture.

11. A process for making magnesium hydroxide which consists in forming a solution of a magnesium salt in water the amount of magnesium salt exclusive of water of hydration being at least 8% of the solution, adding ammonia to the solution in an amount approximately three times the theoretical amount required to combine with the magnesium salt, and recovering the magnesium hydroxide from the mixture.

WALTER HOGE MacINTIRE.